(12) United States Patent
Guo et al.

(10) Patent No.: US 9,288,134 B2
(45) Date of Patent: Mar. 15, 2016

(54) SERVER-CENTRIC HIGH PERFORMANCE NETWORK ARCHITECTURE FOR MODULAR DATA CENTERS

(75) Inventors: Chuanxiong Guo, Nanjing (CN); Guohan Lv, Chengdu (CN); Dan Li, Beijing (CN); Haitao Wu, Beijing (CN); Yunfeng Shi, Beijing (CN); Danfeng Zhang, Beijing (CN); Yongguang Zhang, Beijing (CN); Songwu Lu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 606 days.

(21) Appl. No.: 13/273,143

(22) Filed: Oct. 13, 2011

(65) Prior Publication Data

US 2012/0026917 A1 Feb. 2, 2012

Related U.S. Application Data

(63) Continuation of application No. 12/351,355, filed on Jan. 9, 2009, now Pat. No. 8,065,433.

(51) Int. Cl.
| | |
|---|---|
| *H04L 12/28* | (2006.01) |
| *H04L 12/729* | (2013.01) |
| *H04L 12/24* | (2006.01) |
| *H04L 12/721* | (2013.01) |
| *H04L 12/933* | (2013.01) |
| *H04L 12/931* | (2013.01) |

(52) U.S. Cl.
CPC .............. *H04L 45/125* (2013.01); *H04L 12/24* (2013.01); *H04L 45/34* (2013.01); *H04L 49/10* (2013.01); *H04L 49/356* (2013.01)

(58) Field of Classification Search
CPC ................................ H04L 12/56; H04L 12/28
USPC ........................................................ 370/254
See application file for complete search history.

(56) References Cited

U.S. PATENT DOCUMENTS

| | | | |
|---|---|---|---|
| 3,701,112 A | 10/1972 | Hagelbarger | |
| 4,833,468 A | 5/1989 | Larson et al. | |
| 5,067,127 A | 11/1991 | Ochiai | |
| 5,088,032 A | 2/1992 | Bosack | |
| 5,353,412 A | 10/1994 | Douglas et al. | |
| 5,519,694 A | 5/1996 | Brewer et al. | |
| 5,521,591 A | 5/1996 | Arora et al. | |
| 5,617,538 A | 4/1997 | Heller | |
| 5,669,008 A | 9/1997 | Galles et al. | |
| 6,016,306 A | 1/2000 | Le Boudec et al. | |
| 6,018,523 A | 1/2000 | Even | |
| 6,047,331 A | 4/2000 | Medard et al. | |
| 6,230,252 B1 | 5/2001 | Passint et al. | |
| 6,370,571 B1 | 4/2002 | Medin, Jr. | |

(Continued)

OTHER PUBLICATIONS

Al-Fares et al., "A Scalable, Commodity Data Center Network Architecture," retrieved on Dec. 2, 2008 at <<http://ccr.sigcomm.org/online/files/p63-alfares.pdf>>, SIGCOMM, Aug. 17-22, 2008, Seattle, Washington, ACM, 2008, pp. 63-74.

(Continued)

*Primary Examiner* — Shripal Khajuria
(74) *Attorney, Agent, or Firm* — Steve Wight; Sandy Swain; Micky Minhas

(57) ABSTRACT

Disclosed are systems and methods for network architecture that is a server-centric network architectural design.

20 Claims, 9 Drawing Sheets

(56) References Cited

U.S. PATENT DOCUMENTS

| | | |
|---|---|---|
| 6,618,371 B1 | 9/2003 | Cao |
| 6,728,205 B1 | 4/2004 | Finn et al. |
| 6,928,484 B1 | 8/2005 | Huai et al. |
| 6,990,111 B2 | 1/2006 | Lemoff et al. |
| 7,000,070 B2 | 2/2006 | Moriwaki et al. |
| 7,075,892 B2 | 7/2006 | Grover et al. |
| 7,111,061 B2 | 9/2006 | Leighton et al. |
| 7,113,506 B1 | 9/2006 | Cao |
| 7,152,096 B2 | 12/2006 | Yamamoto et al. |
| 7,221,677 B1 | 5/2007 | Reed et al. |
| 7,278,273 B1 | 10/2007 | Whitted et al. |
| 7,382,775 B2 | 6/2008 | Hesse |
| 7,466,701 B2 | 12/2008 | Mondinelli et al. |
| 7,633,940 B1 | 12/2009 | Singh et al. |
| 7,643,468 B1 | 1/2010 | Arregoces et al. |
| 7,751,344 B2 | 7/2010 | Leonard et al. |
| 7,787,449 B2 | 8/2010 | Cao |
| 7,872,990 B2 | 1/2011 | Guo et al. |
| 7,957,400 B2 | 6/2011 | Henry et al. |
| 2002/0122228 A1 | 9/2002 | Rappaport et al. |
| 2002/0145982 A1 | 10/2002 | Talpade et al. |
| 2002/0187770 A1 | 12/2002 | Grover et al. |
| 2005/0188055 A1 | 8/2005 | Saletore |
| 2006/0104267 A1 | 5/2006 | Mondinelli et al. |
| 2006/0112297 A1 | 5/2006 | Davidson |
| 2006/0200696 A1 | 9/2006 | Shimada |
| 2007/0050520 A1 | 3/2007 | Riley |
| 2007/0070993 A1 | 3/2007 | Cao |
| 2008/0069109 A1 | 3/2008 | Benner et al. |
| 2008/0109544 A1 | 5/2008 | Leonard et al. |
| 2008/0126571 A1 | 5/2008 | Leonard et al. |
| 2008/0126572 A1 | 5/2008 | Holt |
| 2009/0106529 A1 | 4/2009 | Abts et al. |
| 2009/0274043 A1 | 11/2009 | Guo et al. |
| 2009/0274063 A1 | 11/2009 | Guo et al. |
| 2009/0307334 A1 | 12/2009 | Maltz et al. |
| 2010/0020806 A1 | 1/2010 | Vahdat et al. |
| 2010/0180048 A1 | 7/2010 | Guo et al. |
| 2010/0250784 A1 | 9/2010 | Henry et al. |
| 2011/0016223 A1 | 1/2011 | Iannaccone et al. |

OTHER PUBLICATIONS

Barroso et al., "Web Search for a Planet: The Google Cluster Architecture," retrieved on Dec. 2, 2008 at <<http://research.google.com/archive/googlecluster-ieee.pdf>>, IEEE Micro, IEEE, 2003, pp. 22-28.

Bhuyan et al., "Generalized Hypercube and Hyperbus Structures for a Computer Network," retrieved on Dec. 2, 2008 at <<http://ieeexplore.ieee.org/stamp/stamp.jsp?arnumber=1676437&isnumber=35237>>, IEEE Transactions on Computers, vol. C-33, No. 4, Apr. 1984, pp. 323-333.

Borthakur, "The Hadoop Distributed File System: Architecture and Design," retrieved on Dec. 2, 2008 at <<http://hadoop.apache.org/core/docs/r0.16.4/hdfs_design.pdf>>, The Apache Sotware Foundation, 2007, pp. 1-14.

"CloudStore. High Performance Scalable Storage," retrieved on Dec. 2, 2008 at <<http://kosmosfs.sourceforge.net/>>, 2008, 1 page.

Cohen, "Incentives Build Robustness in Bit-Torrent," retrieved on Dec. 2, 2008 at <<http://www.bittorrent.org/bittorrentecon.pdf>>, May 22, 2003, pp. 1-5.

Costa et al., "Why Should We Integrate Services, Servers, and Networking in a Data Center?" ACM, in the Proceedings of the 1st ACM Workshop on Research on Enterprise Networking Applications, Technologies, Architectures, and Protocols for Computer Communication, Session: Data Center Networks, 2009, pp. 111-118.

Dean et al., "MapReduce: Simplified Data Processing on Large Clusters," retrieved on Dec. 2, 2008 at <<http://labs.google.com/papers/mapreduce-osdi04.pdf>>, Google, Inc., OSDI, 2004, pp. 1-13.

Duato et al., "Interconnection Networks: An Engineering Approach," Morgan Kaufmann, 2003, 250 pages.

Frank, "Edge-Disjoint Paths in Planar Graphs," 1985, Journal of Combinatorial Theory, Series B 39, pp. 164-78.

Ghemawat et al., "The Google File System," retrieved on Dec. 2, 2008 at <<http://labs.google.com/papers/gfs-sosp2003.pdf>>, SOSP, Oct. 19-22, 2003, Bolton Landing, New York, ACM, 2003, 15 pages.

Greenberg et al., "Towards a Next Generation Data Center Architecture: Scalability and Commoditization," retrieved on Dec. 2, 2008 at <<http://conferences.sigcomm.org/sigcomm/2008/workshops/presto/papers/p57.pdf>>, Microsoft Research, PRESTO, Aug. 22, 2008, Seattle, Washington, ACM, 2008, pp. 57-62.

Greenberg et al., "VL2: A Scalable and Flexible Data Center Network," ACM SIGCOMM Computer Communication Review, Session: Datacenter Network Design, 2009, vol. 39, Issue 4, pp. 51-62.

Guo et al., "BCube: A High Performance, Server-Centric Network Architecture for Modular Data Centers," ACM SIGCOMM Computer Communication Review, Session: Datacenter Network Design, 2009, vol. 39, Issue 4, pp. 63-74.

Guo et al., "DCell: A Scalable and Fault-Tolerant Network Structure for Data Centers," retrieved on Dec. 2, 2008 at <<http://ccr.sigcomm.org/online/files/p75-guoA.pdf>>, SIGCOMM Aug. 17-22, 2008, Seattle, Washington, ACM, 2008, pp. 75-86.

Hamilton, "An Architecture for Modular Data Centers," retrieved on Dec. 2, 2008 at <<http://arxiv.org/ftp/cs/papers/0612/0612110.pdf>>, CIDR, 2007, 8 pages.

Harker, "The Modular Computing Opportunity, Where Blades, Grids, Networks, System Software and Storage Converge," retrieved on Dec. 2, 2008 at <<http://www.pacificgrids.com/docs/ModularComputingWP.htm>>, ZNA Communications, 2003, pp. 1-8.

"IBM. Scalable Modular Data Center," retrieved on Dec. 2, 2008 at <<http://www-935.ibm.com/services/us/its/pdf/smdc-ebsfe03001-usen-00-022708.pdf.>>, 1 page.

Isard et al., "Dryad: Distributed Data-Parallel Programs from Sequential Building Blocks," retrieved on Dec. 2, 2008 at <<http://research.microsoft.com/users/mbudiu/eurosys07.pdf>>, EuroSys Mar. 21-23, 2007, Lisboa, Portugal, ACM, 2007, 14 pages.

Katz, "Tech Titans Building Boom," Feb. 2009, IEEE Spectrum—Inside Technology, Retrieved on Jun. 10, 2010 at <<http://spectrum.ieee.org/green-tech/buildings/tech-titans-building-boom/0>> pp. 1-9.

Leighton, "Introduction to Parallel Algorithms and Architectures: Arrays. Trees, Hypercubes," retrieved on Dec. 2, 2008 at <<http://delivery.acm.org/10.1145/1000000/990672/p31-das.pdf?key1=990672&key2=0257828221&coll=GUIDE&dl=GUIDE&CFID=13681150&CFTOKEN=47604607>>, Morgan Kauffman Pub, 1992, pp. 31-32.

Leiserson, "Fat-Trees: Universal Networks for Hardware-Efficient Supercomputing," retrieved on Dec. 2, 2008 at <<http://courses.csail.mit.edu/6.896/spring04/handouts/papers/fat_trees.pdf>>, IEEE Transactions on Computers, vol. C-34, No. 10, Oct. 1985, pp. 892-901.

Mysore et al., "Portland: A Scalable Fault-Tolerant Layer 2 Data Center Network Fabric," ACM SIGCOMM Computer Communication Review, Session: Datacenter Network Design, 2009, vol. 39, Issue 4, pp. 39-50.

Naous et al., "NetFPGA: Reusable Router Architecture for Experimental Research," retrieved on Dec. 2, 2008 at <<http://conferences.sigcomm.org/sigcomm/2008/workshops/presto/papers/p1.pdf>>, PRESTO Aug. 22, 2008, Seattle, Washington, ACM, 2008, pp. 1-7.

Newton, "Newton's Telecom Dictionary," 22nd Updated and Expanded Edition, CMP Books, 2006, 4 pages.

"Rackable Systems ICE CubeTM Modular Data Center, Mobile, Containerized Computing," retrieved on Dec. 2, 2008 at <<http://www.rackable.com/products/icecube.aspx>>, Rackable Systems, 2008, pp. 1-2.

Shi et al., "Hyper-Butterfly network: A Scalable Optimally Fault Tolerant Architecture," Proceedings of the 1998 IPPS/SPDP, pp. 1-5.

"The High-Performance Network for the Data Center, Reducing Complexity by Simplifying the Enterprise Data Center Network," retrieved on Dec. 2, 2008 at <<http://www-935.ibm.com/services/cn/gts/pdf/160028.pdf>>, Juniper Networks, 2008, pp. 1-8.

(56) References Cited

OTHER PUBLICATIONS

"The Optimal Interconnect for High Performance Clustered Environments: A Look at Infiniband and Hewlett-Packard's Implementation," retrieved on Dec. 2, 2008 at <<http://www.mellanox.com/pdf/whitepapers/Cambridge_Whitepaperfinal.pdf>>, Cambridge Consulting, May 30, 2004, pp. i-iii and 1-10.

"The Verari FOREST Container Solution: The Future in Data Center Consolidation," retrieved on Dec. 2, 2008 at <<http://www.verari.com/documents/datasheets/container.pdf>>, Verari Systems, 2008, 2 pages.

Waldrop, Data Center in a Box, retrieved on Dec. 2, 2008 at <<http://www.sciam.com/article.cfm?id=data-center-in-a-box&print=true>>, Scientific American, 2007, pp. 1-4.

Wu, "MDCube: A High Performance Network Structure for Modular Data Center Interconnection," Proceedings of the 5th international conference on Emerging networking experiments and technologies, 2009, 12 pages.

Office Action for U.S. Appl. No. 12/705,510, mailed on Mar. 14, 2012, Haitao Wu, "Network Structure for Data Center Unit Interconnection", 18 pgs.

400 ↘

402 ↘ /*A and B */
BuildPathSet($A,B$):
    PathSet = { };
    for($i = k; i\ 0;$ )
        if ()
            $P_i$ = DCRouting($A,B,i$);
        else /**/
            $C$ = a neighbor of $A$ at level $i$; /**/
            $P_i$ = AltDCRouting($A,B,i,C$);
        add $P_i$ to PathSet;
    return PathSet;

404 ↘
DCRouting($A,B,i$):
    $m = k$;
    for($j = i$;)
        mod ;
    path = BCubeRouting($A,B$, Π);
    return path;

406 ↘
AltDCRouting($A,B,i,C$):
    path = {$A,$};
    $m = k$;
    for()
        mod ;
    path += BCubeRouting($C,B$, Π);
    return path;

502 ⟶
PathSelection(src, dst):
Source:
    when a flow arrives or probing timer timeouts:
        goodPathSet = { };
        pathSet = BuildPathSet(src, dst);
        while (pathSet not empty)
            *path* = pathSet.remove();
            if (ProbvePath(*path*) succeeds)
                goodPathSet.add(*path*);
            else
                altPath = BFS(pathSet, *goodPathSet*);
                if(*altPath.len*() thresh)
                    pathSet.add(*altPath*);
        return SelectBestPath(goodPathSet);

504 ⟶
Intermediate_server: /*receiver is not pkt.dst*/
    when a path *pkt* is received:
        ava_band = min(ava_band_in, ave_band_out);
        if (ava_band  pkt.ava_band)
            pkt.ava_band  ava_band;
        forward(*pkt*);

506 ⟶
Destination: /*receiver is pkt.dst*/
    when a path proving pkt is received:
        if (ava_band_in  pkt.ava_band)
            pkt.ava_band = ava_band_in;
        reverse the path in *pkt*;
        route *pkt* back to *src*;

Fig. 5

SERVER-CENTRIC HIGH PERFORMANCE NETWORK ARCHITECTURE FOR MODULAR DATA CENTERS

RELATED APPLICATION

This application is a continuation of U.S. patent application Ser. No. 12/351,355, filed on Jan. 9, 2009, which is incorporated by reference herein.

BACKGROUND

Modular data center (MDC), such as shipping-container based systems, offers a new way in which data centers are built and deployed. For example, in an MDC, up to a few thousand server computers may be interconnected via switches to form a network infrastructure, such as a typical, two-level tree structure. For example, the servers and switches may be packed into a standardized 20 or 40 foot shipping container. Since the MDC is not tied to a fixed location, organizations can place the MDC anywhere and relocate as needs change. In addition to a high degree of mobility, an MDC has other benefits compared with the data center facilities, such as data centers built from server racks. Such benefits may include higher system and power density, lower cooling requirements, and lower manufacturing costs.

The downsides of typical MDC architectures may include bandwidth-intensive requirements, and all-to-all or one-to-many communications among MDC servers. Therefore, there exists a need to support high inter-server bandwidth, as well as aggregate throughput, in an MDC architecture. Furthermore, server/switch failure may occur during continuous full-time operations. Therefore, there is also a need to achieve graceful performance degradation when such failures occur.

SUMMARY

This document describes a network architecture that is a server-centric network architectural design, where each server computer may have multiple network ports and serves not only as an end host, but also as an intermediate relay node for other servers.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 4 is a listing of procedure to determine parallel paths between two servers.

FIG. 5 is a listing of a procedure for Path Selection.

FIG. 3 is an exemplary edge-disjointed complete graph.

FIG. 4 is a block diagram of an exemplary packet.

FIG. 5 is a flowchart that illustrates an exemplary method for constructing a server-centric network architecture.

DETAILED DESCRIPTION

Described herein are "tools" and methods to a network architecture designed for modular data centers or MDCs, such as shipping-container-based MDCs. The described network architecture may be referred to as a hybrid Butterfly Cube architecture or "BCube". References to the described network architecture may incorporate "BCube". The described network architecture is a server-centric network architectural design, where each server computer may have multiple network ports and serves not only as an end host, but also an intermediate relay node for other servers.

Figure 1:
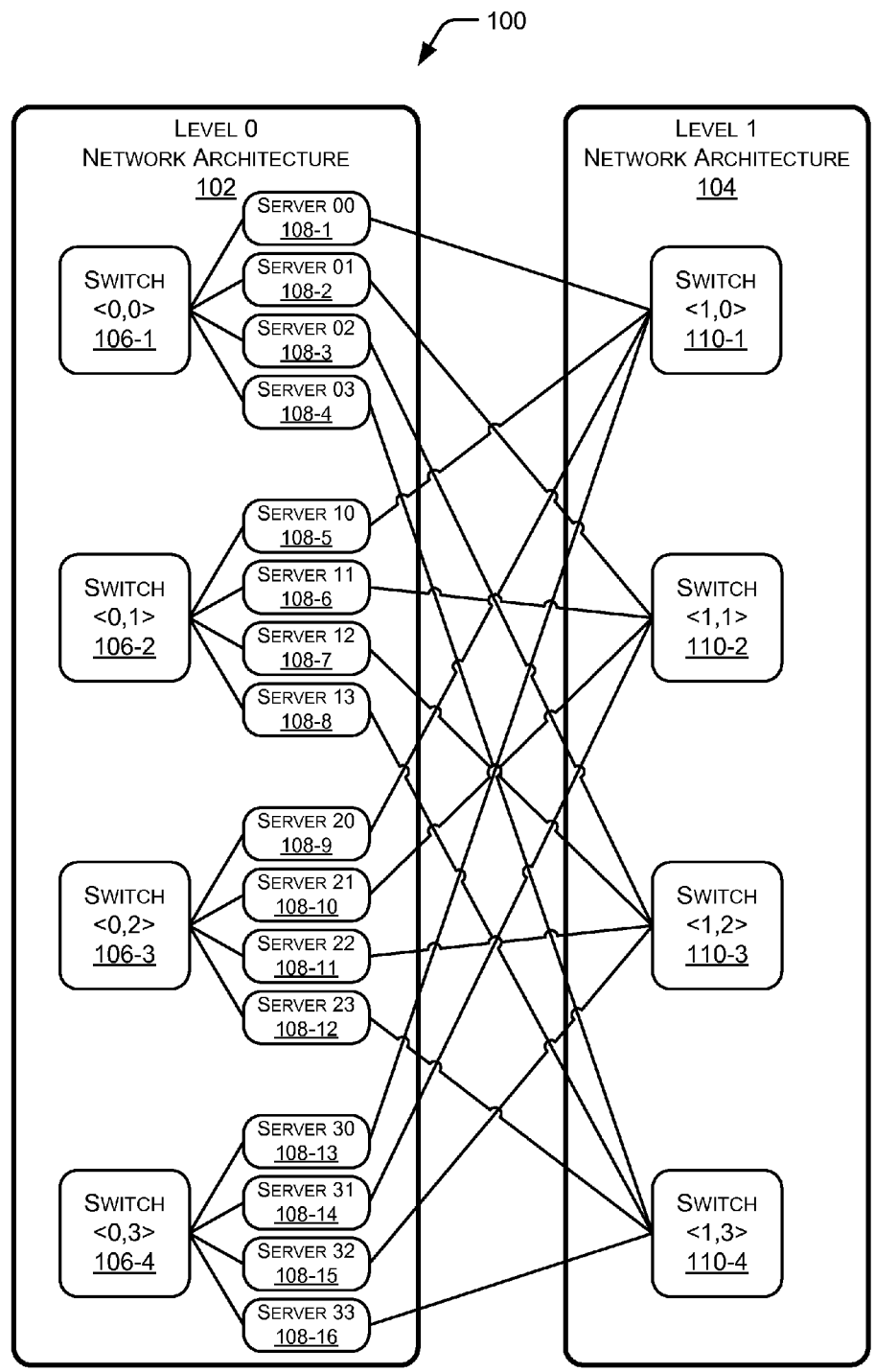
FIG. 1 is a block diagram of an exemplary network architecture for modular data centers.

FIG. 1 illustrates an exemplary BCube network architecture 100. The BCube network architecture 100 may be used for an MDC. The network architecture 100 includes a level-0 network architecture 102 and a level 1 network architecture 104. In this example the level-0 network architecture 102 includes switches 106 and servers 108, and level 1 network architecture includes switches 110.

Switches 106 and 110 are multiple layers of switches, which may be used to connect to the server computers or servers 108; however, the switches 106 and 110 never connect to each other directly. As further discussed below, the switches 106 and 110 may be commodity off-the-shelf or COTS switches. The described network architecture 100 may provide a high aggregate network capacity due to a small network diameter (i.e., network diameter is defined as the longest "shortest" path among all server pairs), and may also provide multiple node-disjoint short paths between any two servers 108. In the interconnection architecture, each server 108 may be equipped with a small number of ports, for example four or fewer ports. In certain implementations, multiple layers of inexpensive COTS mini-switches 106 and 110 are used to connect the servers 106. The described network architecture 100 may be a low-diameter structure that provides high aggregate network capacity for other distributed computing framework, such as the MapReduce framework. The described network architecture may also provide multiple parallel short paths between pairs of servers, which may provide high inter-server bandwidth, and also improve fault tolerance and load balancing. Furthermore, edge-disjointed complete graphs, as described below, may be constructed with the BCube network, which can speed up data replications by several times for distributed file systems, such as Google® File System or GFS.

BCube Structure

In the example of FIG. 1, the level-1 network architecture 102 is n=4 and k=1, where "k" denotes the level of the BCube network architecture, and "n" is the number of ports a switch has. In this case, the level-1 network architecture 102 has 4 level-0 network architectures 104, and each level-0 architecture 104 has 4 servers 108. Each server 108 has two ports, where the level-0 port connects to a level-0 switch and the level-1 port connects to a level-1 switch, respectively.

As described in the example of FIG. 1, there are two types of devices in the described network architecture 100: servers 108 that may have a small number of network ports and switches 106 and 110 that connect the servers 108. The BCube network architecture 100 can be recursively described. The high level network architecture 100 may include several low level network architectures. In this example, level-0 network architecture 102 is n servers that connect to a switch. A level-k network architecture (k>0), which we denote as $BCube_k$, has $n^{k+1}$ servers and is built from n level-(k−1) network architecture $BCube_{k-1}$s and $n^k$ switches, referred to as $n^k$ switches the level-k switches. A server (e.g., servers 108) in a $BCube_k$ has k+1 ports, which are numbered from level-0 to level-k. Servers (e.g., servers 108) in the $BCube_{k-1}$ may be connected to the level-k switches (e.g., switches 106 and 110) as follows. The servers (e.g., servers 108) in each $BCube_{k-1}$ are numbered, and the level-k switches from 0 to $n^k-1$ are numbered, respectively. The i-th ($0 \le i < n^k$) server of each $BCube_{k-1}$ is connected to the i-th level-k switch, using the level-k server ports.

In the described network architecture 100, switches 106 and 110 never directly connect to other switches 106 and 110, which allows for routing intelligence placed solely to the servers 108. Switches 106 and 110 may only be used as crossbars to interconnect several servers 108. Therefore, use COTS switches may be implemented, without any re-programming. Furthermore, when each switch (e.g., switches 106 and 108) has 8 ports and each server 108 has 4 ports, a BCube network architecture can contain up to 4096 servers. Therefore, a shipping-container MDC with thousands of servers may be implemented with COTS mini-switches.

A $BCube_k$ has a low network diameter k+1 (k may typically be no more than 3). Low network diameter leads to high aggregate network capacity since packets do not need to traverse many intermediate nodes. Furthermore, a $BCube_k$ provides k+1 parallel paths between any two servers and it contains many small edge-disjointed complete graphs. Multi-paths provide high inter-server (e.g., server 108) throughput, which cannot be provided by structures where servers have only one link; and the edge-disjointed complete graphs accelerate chunk replications by several times for distributed file systems.

On top of the described network architecture 100 physical structure, implementation may be made of a fault-tolerant and load-balancing source routing protocol or BCube Source Routing or BSR, further described below, and a fast packet forwarding engine, also described below. The BSR protocol may exhibit graceful degradation in terms of throughput as the rate of server and switch failures increases. The forwarding engine may decide the next hop of a packet by only one table lookup. BSR places routing intelligence solely onto servers 106. By actively probing the network 100, BSR avoids link-state distribution, handles failures, and balances traffic in a unified fashion. With BSR, the capacity of the described network architecture 100 decreases gracefully as server/switch (e.g., server 108, and switches 106 and 110) failure increases. By leveraging the topology property of the described network architecture 100 and BSR, a fast packet forwarding engine delivers packets to the next hop with only one forwarding table lookup. For example, the forwarding table may use only 2 KB memory and is almost static.

The described network architecture departs from the typical tree-based architectures to achieve higher inter-server throughput, enhanced fault tolerance, and load balancing among servers 108 in a MDC (i.e., BCube network 100).

Low-end, relatively inexpensive, non-programmable COTS switches may be used instead of relatively high-end high-priced switches for switches 106 and 110, based on the observation that the per-port price of the low-end switches is much cheaper than the high-end switches with greater capabilities, while providing high network capacity.

Typical data center applications may be bandwidth intensive and the network may become a performance bottleneck. For example, MapReduce-based applications may shuffle data among many servers 106. Data shuffling generates an all-to-all traffic pattern in which every server transmits data to all the other servers. As another example, distributed file systems such as GFS, replicate data chunks of a file several times at different chunk servers to improve reliability. The BCube network architecture 100 provides MapReduce traffic patterns with higher aggregate bandwidth, and may provide higher throughput between any two servers 108. This is particularly useful when there exist server pairs 108 that need to exchange large amounts of data, such as to dump crawled Web documents into data repositories.

BCube Construction

The BCube network architecture construction procedure is described in a non-recursive manner. A server is denoted in a $BCube_k$ as an address array $a_k a_{k-1} \ldots a_1 a_0$, where $a_i \in [0, n)$ and $i \in [0, k)$. A server may also be identified by the described network architecture address BCube address $baddr = \sum_{i=0}^{k} \{a_i n^i\}$. A one-to-one mapping between the described network architecture address and its array form may be identified. A switch is denoted as $<l, s_{k-1} s_{k-2} \ldots s_0>$, where $l \in [0,k)$ is the level of the switch and $s_{k-1} s_{k-2} \ldots s_0$ ($s_i \in [0, n)$) numbers the switch at layer l. It is further noted, to use $<l, saddr>$ to denote a switch, where $saddr = \sum_{i=0}^{k-1} s_i n^i$ is the switch address at layer l.

The construction procedure ensures that port $<l, s_{k-1} s_{k-2} \ldots s_0, i>$ of a switch connects to the level-l port of server $s_{k-1} s_{k-2} \ldots s_l i s_{l-1} \ldots s_0$ using a link. It is to be noted that links are bidirectional in the described network architecture. Numbering of the n ports of a switch is $<l, s_{k-1} s_{k-2} \ldots s_0, 0>$, $<l, s_{k-1} s_{k-2} \ldots s_0, 1>$, $\ldots <l, s_{k-1} s_{k-2} \ldots s_0, n-1>$.

The BCube network architecture is a modular structure, since there may be no need to re-wire the $BCube_{k-1}$ network when a $BCube_k$ network is built from n existing $BCube_{k-1}$ network architectures. A given $BCube_k$ network architecture has $N = n^{k+1}$ servers and k+1 levels of switches, with $n^k$ switches at each level. When n=8 and k=3, 4096 servers may be supported in the BCube network architecture.

The described network architecture structure is closely related to both the generalized Butterfly and the Hypercube, leading to the term "BCube."

Figure 2:
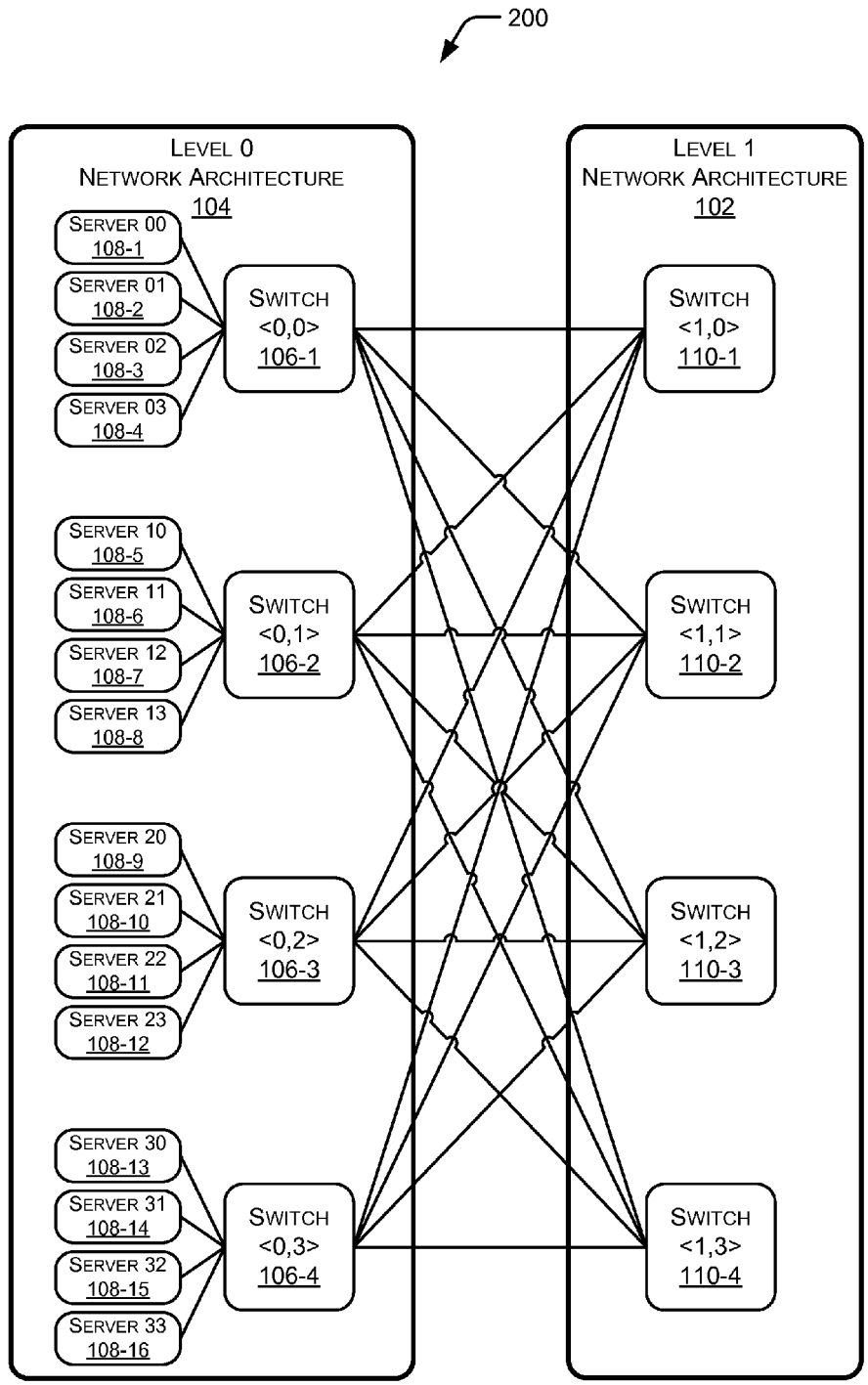
FIG. 2 is a block diagram of an exemplary network architecture for modular data centers implementing a Butterfly connection.

FIG. 2 shows a generalized Butterfly network architecture 200. In the BCube network architecture, instead of connecting the level-i (i>0) switches to the level-(i−1) switches rather than to the servers 108, as shown in FIG. 2 (a generalized Butterfly network architecture 200), if each switch is replaced and its n links with an n×(n−1) full mesh that directly connects the servers 108, a generalized Hypercube network as illustrated by the BCube network 100 of FIG. 1 is realized.

The value h(A, B) denotes the Hamming distance of the two servers A and B (e.g., servers 108), which is the number of different digits of their address arrays. The maximum Hamming distance in a $BCube_k$ is k+1.

When the Hamming distance of the two servers A and B is 1 (one), the two servers are connected to the same switch. From the addresses of A and B, the switch S may be uniquely identified. For servers $a_k \ldots a_{l+1} x a_{l-1} \ldots a_0$ and $a_k \ldots a_{l+1} y a_{l-1} \ldots a_0$, the switch that connects them is $<l, a_k \ldots a_{l+1} a_{l-1} \ldots a_0>$. Therefore, when a path from a source server to a destination server is denoted, only the intermediate servers are identified.

Single-Path Routing in BCube

From the construction of the BCube network architecture, it may be determined that the servers connected to the same switch differ in a single digit. Specifically, the servers that connect to a level-i switch differ at the i-th digit.

Figure 3:
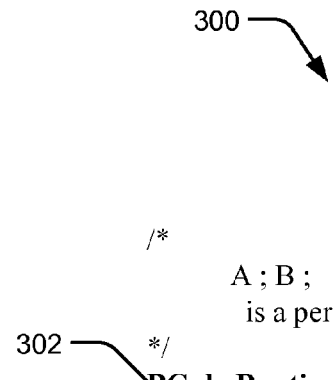
FIG. 3 is a listing of a BCubeRouting algorithm.

FIG. 3 shows a listing 300 for a BCubeRouting algorithm 302.

The BCubeRouting algorithm 302 may be used to find a path from servers A to B. The BCubeRouting algorithm 302 corrects one digit at one step. The digit correcting order is decided by a predefined permutation Π.

In BCubeRouting algorithm 302 $A=a_k a_{k-1} \ldots a_0$ is the source server and $B=b_k b_{k-1} \ldots b_0$ is the destination server, and Π is a permutation of $\{0, 1, \ldots k-1\}$. A series of intermediate servers may be systematically built by "correcting" one digit of the previous server. Therefore, the path length may at most be k+1. It is to be noted that the intermediate switches can be uniquely determined by its two adjacent servers.

Multi-Paths in BCube

Two parallel paths between a source server and a destination server exist if they are node-disjointed (i.e., the intermediate servers and switches on one path do not appear on the other). The following describes how to generate two parallel paths between two servers.

Given that two servers $A=a_k a_{k-1} \ldots a_0$ and $B=b_k b_{k-1} \ldots b_0$ are different in every digit (i.e., $a_i \neq b_i$ for $I \in [0, k]$), BCubeRouting generates two parallel paths from A to B using two permutations $\Pi_0 = [i_0, (i_0-1) \bmod (k+1), \ldots, (i_0-k) \bmod (k+1)]$ and $\Pi_1 = [i_1, (i_1-1) \bmod (k+1), \ldots, (i_1-k) \bmod (k+1)]$ ($i_0 \neq i_1$ and $i_0, i_1 \in [0,k]$).

The permutations $\Pi_0$ and $\Pi_1$ start from different locations of the address array and then correct the digits sequentially. This pattern ensures that the used switches are always at different levels for the same digit location, hence producing the two parallel paths.

It is determined that when the digits of A and B are different, there are k+1 parallel paths between them. It is also observed that the number of parallel paths between two servers is upper bounded by k+1, since each server has only k+1 links. It follows that there are k+1 parallel paths between any two servers (e.g., servers 108) in a $BCube_k$ network architecture. This may be proven by constructing k+1 as follows.

FIG. 4 shows a listing 400 to determine k+1 parallel paths between two servers in a $BCube_k$ network architecture.

The construction procedure, BuildPathSet 402, is based on how two parallel paths between servers may be generated, as discussed above. For two servers $A=a_k a_{k-1} \ldots a_0$ and $B=b_k b_{k-1} \ldots b_0$, the paths built by BuildPathSet 402 fall into two categories: the paths constructed by DCRouting 404 (i.e., permutations start from digits $a_i \neq b_i$) and those constructed by AltDCRouting 406. There are h(A, B) and k+1−h(A, B) paths in the first and second categories, respectively. By removing the digits $a_i = b_i$ in all the servers), it is observed that the paths in the first category are parallel.

Next, it is determined that paths in the second category are also parallel. Assuming that $a_i = b_i$ and $a_j = b_j$ for two different i and j. The i-th digit of all the intermediate servers in path $P_i$ is a value $c_i \neq a_i$, whereas it is ai in all the intermediate servers in path $P_j$. Similarly, the $j^{th}$ digits of $P_i$ and $P_j$ are also different. The intermediate servers in $P_i$ and $P_j$ differ by at least two digits. The switches in $P_i$ and $P_j$ are also different, since a switch connects only to servers that differ in a single digit. Therefore, the paths in the second category are parallel.

It may be shown that paths in both categories are parallel. First, the intermediate servers of a path in the second category are different from the servers in the first category, since there is at least one different digit (i.e., the i-th digit $c_i$). Second, the switches of a path in the second category are different from those in the first category, due to the fact that switches in the second category have $c_i$ whereas those in the first category have $a_i$ in the same position.

From BuildPathSet 402, it may be further observed that the maximum path length of the paths constructed by BuildPathSet 402 be k+2. The length of the paths in the first category is h(A, B). The length of the paths in the second category is h(A, B)+2. The maximum value of h(A, B) is k+1. Therefore, the maximum path length is at most k+3. However, k+3 is not possible, since when h(A, B)=k+1, the number of paths in the second category is 0. The parallel paths created by BuildPathSet 402, therefore are of similar, small path lengths.

The following illustrates the multiple paths between two servers 0001 and 1011 in a BCube network with n=8 and k=3.

$P_3$: {0001, <3,001>,1001,<1,101>,1011}
$P_2$: {0001, <2,001>,0101,<1,011>,0111,
<3,111>,1111,<2,111>,1011}
$P_1$: {0001, <1,001>,0011,<3,011>,1011}
$P_0$: {0001, <0,000>,0002,<3,002>,1002,
<1,102>,1012,<0,101>,1011}

The Hamming distance of the two servers is h(A, B)=2. Therefore, there are two paths of length 2. The two paths are $P_3$ and $P_1$. There are also two paths of length h(A,B)+2=4. The two paths are $P_2$ and $P_0$, respectively. The intermediate switches in the paths may also be listed. It is possible o verify that all the paths are parallel ones, since an intermediate server/switch on one path never appears on other paths.

BCube Source Routing

The BCube Source Routing Protocol or BSR takes advantage of the multi-path capability of described network architecture 100. BSR probes the multiple parallel paths to select the path with the maximum available bandwidth. The selected path then may be encoded into transmitted packets. By using probing-based source routing, link state broadcasting is avoided. BSR not only provides a unified framework for fault-tolerance and load-balance, but also enables graceful throughput degradation as server/switch failures increase. BSR is a reactive source routing protocol, which achieves fault tolerance and load balancing by leveraging the described network architecture's multi-path capability. Moreover, BSR enables graceful performance degradation as the server/switch failure rate increases.

In BSR, the source server (e.g., server 108) decides which path a packet flow should traverse by probing the network. Source routing is used for two reasons. First, intermediate servers may not need to maintain and compute a routing table, which simplifies their functionalities. Reactive source routing is chosen to avoid link state broadcasting, which suffers from scalability concerns when thousands of servers are operational. Second, source routing allows for the source servers to decide which path to use. This is consistent with the objective to place intelligence on the server side.

BSR Idea

In BSR, the same path for packets of the same flow may be chosen. This may avoid a packet out-of-order problem. A flow may be defined as a stream of packets that has the same values for a subset of fields of the packet header, e.g., (src, dst) address pair, or the five-tuple: (src, src_port, dst, dst_port, prot). A duplex flow (e.g., a TCP connection) is considered as two simplex flows. Path selections are performed for these two simplex flows separately, since network conditions along opposite directions may vary significantly.

For a flow, BSR uses a path probing and selection procedure to select the best path (i.e., the one with maximum available bandwidth) from the parallel paths. It may also be possible to use other metrics such as minimum end-to-end delay; however, available bandwidth is used as an example.

When a new flow arrives (e.g., a TCP sync packet is received), path probing and selection will be triggered. A decision may be made as to whether to buffer the packets for the upcoming flows during probing. Therefore, a default path may be chosen from BuildPathSet (as described below) and use the default path to forward packets for these new flows. Simultaneously, path probing and selection may be performed. After the path selection completes and a better path is selected, a switch to the new path is performed.

After probing, the source server selects the path with the maximum available bandwidth from all available paths. If there are several paths with the identical, maximum available bandwidth, the shortest path is preferred. If there are more than one candidate paths, a path is selected by hashing the flow signature (e.g., the five-tuple) to break the tie. The flow then uses that path for packet transmission.

The Path Selection Procedure

FIG. 5 shows a detailed Path Selection procedure 500. As shown, the exemplary Path Selection procedure 500 has three parts 502, 504, and 506, which describe how source, intermediate, and destination servers perform.

When a source server (e.g., servers 108) performs PathSelection 502, the source server first obtains k+1 parallel paths by using BuildPathSet. The source server then probes the k+1 paths. If one path is found not available, the source server tries to find another parallel path. The parallel path is selected as follows. The source server removes the existing parallel paths from a $BCube_k$ graph, and then uses a Breadth First Search (BFS) algorithm to find a path from the source server to the destination server. When links are of equal weight, BFS is a shortest-path routing algorithm. When a path is found, the path is assured to be parallel to the existing paths. A maximum path length threshold may be set. If the path length is larger than the threshold, the path is not included into the parallel paths set, since a long path is not efficient and wastes network bandwidth. The threshold value is a tunable parameter. When BFS cannot find a path, we know that the number of parallel paths is smaller than k+1.

BFS may be very fast for a described network architecture network that has thousands of servers. For example, in BCube architecture network with n=8 and k=3, the execution time of BFS may less than 1 millisecond in the worst case, using a 2.33 GHZ dual-core CPU. The source server can use several optimizations to further reduce computation time. For example, if a first-hop (or last hop) link is not available, the source server does not need to search for k+1 parallel paths since the maximum number of parallel paths becomes k. Also, a server can maintain a set of broken links by receiving and overhearing the path failure messages. These failed links can be readily removed from the described network architecture graph.

When an intermediate server receives a probing packet, the intermediate server updates the available bandwidth field of the probing packet, if its available bandwidth is smaller than the existing value. The available bandwidth of the intermediate server is the minimum of available bandwidths of its incoming and outgoing links. This is performed, since two adjacent servers A (e.g., servers 108) and B (e.g., servers 108) in the BCube architecture may be indirectly connected via a switch S (e.g., switches 106 and 110). Therefore, the available bandwidth from A to B is the minimal value of the bandwidth from server A to switch S, and that from switch S to server B.

When a destination server receives a probing packet, destination server first updates the available bandwidth field of the probing packet when the available bandwidth of the incoming link is smaller than the value carried in the probing packet. After that, the destination server reverses the path of the probing packet and changes the message type from probing to response and sends the packet back to the source.

Path Adaptation

Path selection is first performed when a new flow arrives. After that, it is performed periodically, for example every 15 seconds. After a path selection completes, all the available paths are recorded in addition to the selected one. Once the path of a flow is determined, the source server encodes the selected path into each packet header of that flow. Intermediate servers then obtain the next hop of the packet by reading the packet header.

Once an intermediate server detects that the next hop is not available, the intermediate server sends back a path failure message to the source server. The source server will select a path from the available paths obtained from the previous probing. To avoid buffering packets, it may be necessary to immediately find another path to replace the broken path. The path may be readily found from the previous probing result. The path may be replaced later when we re-probe the network when probing timer timeouts.

Periodical probing is introduced to make source servers adapt to dynamic changing network conditions. BSR thus handles network failures and balances network traffic in a unified framework.

When multiple flows between two servers arrive simultaneously, they may select the same path. After the path selection timers timeout, they may probe the network and switch to another path simultaneously, resulting in undesirable path oscillation. Two mechanisms may be used to avoid this symptom. First, when there are paths with similar available bandwidth, one path is selected for a flow based on the hash value of the flow signature (e.g., the five-tuple). Second, randomness may be injected/introduced into the timeout value of the path selection timers. The timeout value is a constant plus a small random value. This ensures that different flows will not initiate path selection at the same time.

BCube Protocol Suite

A network architecture protocol suite may be implemented to realize the benefits of the described BCube network architecture. For example, the network architecture protocol suite may be designed under TCP/IP. This makes the described BCube network architecture compatible with all the TCP/IP based applications. By taking advantage of the network architecture's structural property and BSR source routing, it is possible to design and implement a fast packet forwarding engine, which can decide the next hop of a packet by only one table lookup, in both software and hardware.

Low Network Diameter

The diameter, defined as the longest shortest path among all the server pairs, of a $BCube_k$, is k+1. The path length of path (A, B) is h(A, B), where h(A, B) is the Hamming distance of the address arrays of servers A and B. This is because only h(A, B) digits are changed to obtain the path from servers A to B. The maximum path length is therefore k+1. It follows that k+1 is the network diameter of a $BCube_k$ network. In practice, k may be a small integer, for example at the most a value of 3. The described network architecture therefore may be considered a low-diameter network.

Complete Graphs for Replication Speedup

Edge non-overlapping complete graphs with k+2 nodes can be efficiently constructed in a $BCube_k$. The complete graphs can speed up data replications in distributed file systems, such as like GFS. The following illustrates such.

In a $BCube_k$, a server src and a set of servers $\{d_i | 0 \leq i \leq k\}$, where $d_i$ is a one-hop neighbor or src at level i (i.e., src and $d_i$ differ only at the i-th digit), can form an edge-disjointed complete graph in which all the edges are parallel with each other. This can be proven by constructing an edge-disjointed complete graph.

Figure 6:
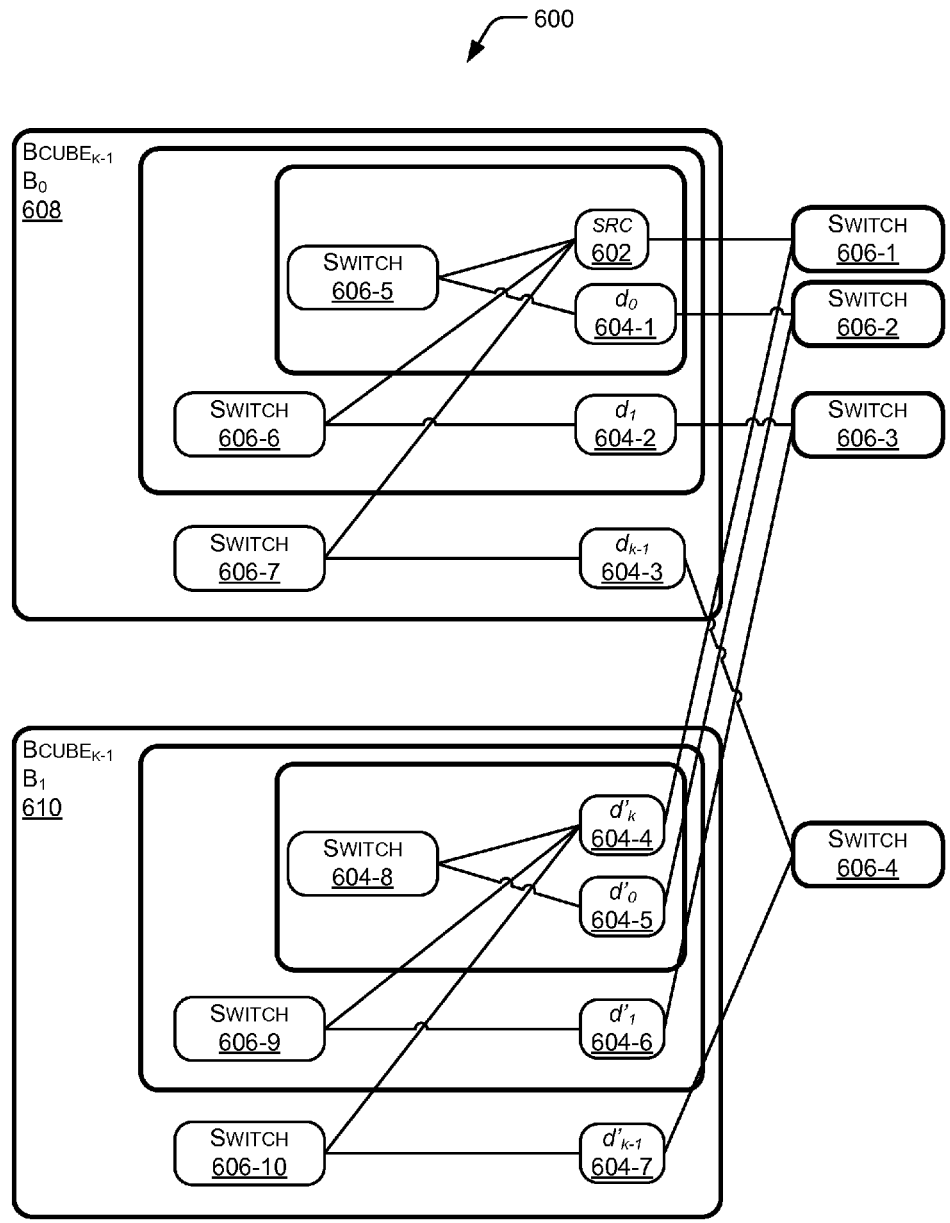
FIG. 6 is a block diagram of an exemplary computing system.

FIG. 6 shows such an edge-disjointed complete graph 600. In FIG. 6, src 602 and servers $d_0$–$d_{k-1}$ 604 are in a $BCube_{k-1}$ $B_0$ 608, and $d_k$ 604-4 is in another $BCube_{k-1}$ $B_1$ 610. The src server 602 and a set of its neighbors servers 604 form an edge non-overlapped complete graph 600. They are connected by switches 606. Assuming that servers in $B_0$ 608 have already formed a complete graph, FIG. 6 illustrates how construct the edges among $d_k$ 604-4 and the rest servers $d_0$–$d_{k-1}$ 604. The key idea is to find k servers $d'_0$–$d'_{k-1}$, where $d'_i(0 \le i<k)$ and $d_k$ 604-4 differ in the i-th digit. It is seen that the Hamming distance between $d_i$ and $d_k$ 604-4 is 2. An edge then be established between $d_i$ and $d_k$ 604-4 via the intermediate server $d'_i$. This edge uses the level-k link of $d_i$ and the level-i link of $d_k$ 604-4. FIG. 6 shows that this edge is node-disjoined with other edges. In other words, the edge does not overlap with the edges in $B_0$ 608 since it uses the level-k link of $d_i$. The edge also does not overlap with the edges in $B_1$ 610 since it uses the level-i link of $d_k$ 604-4. This way, it may be possible to recursively construct the edges between $d_{k-1}$ 604-3 and $d_i(0 \le i<k-1)$, using the level-(k-1) links of $d_i(0 \le i<k-1)$ and level-i link of $d_{k-1}$, etc.

From the construction procedure, it is seen that the longest path in such a complete graph has only two hops (i.e., the diameter of the graph is only two). For server src 602, there exist a huge number of such complete graphs. Server src 602 has n–1 choices for each $d_i$. Therefore, server src 602 can build $(n-1)^{k+1}$ such complete graphs.

In distributed file systems such as GFS, Cloud-Store, and HDFS, a file may be divided into chunks, where each chunk is replicated several times (e.g., typical 3) at different chunk servers to improve reliability. The replicas are chosen to locate at different places. Once the chunk servers are selected, the client writes the data to the nearest chunk server. When the first chunk server starts to receive data, it transmits the data to the next chunk server, and so on. Therefore, the chunk servers form a pipeline to reduce the chunk replication time.

The complete graph built in the described network architecture works well for chunk replication for two reasons. First, the selected servers are located at different levels of the described network architecture, thus improving reliability. Second, complete graph with node-disjointed edges provides a topology for chunk replication speedup. When a client writes a chunk to r chunk servers, the client sends 1/r of the chunk to each of the chunk servers. Meanwhile, a chunk server distributes its copy to the other r–1 servers using the node-disjointed edges. This may be r times faster than the pipeline model.

Partial BCube

In certain cases, it may be difficult or unnecessary to build a complete BCube network architecture structure. For example, when n=8 and k=3, we have 4096 servers in a $BCube_3$. However, due to space constraint, only 2048 servers may be accommodated.

A way to build a partial $BCube_k$ is to first build the $BCube_{k-1}$s and then use a partial layer-k switches to interconnect the $BCube_{k-1}$s. Referring back to FIG. 1, when a partial $BCube_1$ with 8 servers is built, two $BCube_0$s that contain servers 00-03 and 10-13 may be built, then add two switches <1,0> and <1,1> to connect the two $BCube_0$s. However, with this approach, BCubeRouting may not work well for some server pairs. For example, BCubeRouting will not be able to find a path between servers 02 and 13 no matter which routing permutation is used, due to the fact that 02 and 13 are connected to non-existing layer-1 switches. Paths between 02 and 13 can still be established by enlarging the path length. For example, 02 can reach 13 via path {02, 00, 10, 13}; however this approach enlarges path length and reduces network capacity.

In this example, the root cause is that server 02 cannot reach server 13, because switches <1, 2> and <1, 3> do not exist. A solution for partial network architecture construction is as follows. When building a partial $BCube_k$, a first step is to build the needed $BCube_{k-1}$s, then connect the $BCube_{k-1}$s using a full layer of layer-k switches. With a full layer-k switches, BCubeRouting performs in a similar way as a complete network architecture, and BSR and the construction of the complete graphs just work as before.

An apparent disadvantage of using a full layer-k switches is that many switches in layer-k are not fully utilized. The described solution may be preferable, because it makes routing the same for partial and complete BCube network architectures, and allow for the use of inexpensive mini-switches.

Choice of Parameters n and k

For the BCube network architectures that have the same number of N servers, the values of n and k are needed. Initial thought is to have larger k, since a larger k may give more parallel paths between two servers. More parallel paths give more opportunities for fault-tolerance and load-balance; however a larger k also results in more switch ports and higher wiring cost. Furthermore, a larger k does not necessarily result in larger aggregate network capacity. As discussed, the aggregate throughput is $$\frac{n}{n-1}N,$$

which is decided by the total number of servers N. In the example described, n=8 and k=3 are chosen, and these parameters are used to build a partial network architecture with 2048 servers. It follows that n=8 means that cheap COTS mini-switches may be used. In addition, k=3 means each server has 4 ports and there are 4 parallel paths between any two servers. This provides enough fault-tolerance and load-balance.

Routing to External Networks

The description thus far has addressed routing packets inside the described architecture network. However, internal servers may need to communicate with external computers in other containers or the Internet. For example, an assumption may be made that both internal and external computers use TCP/IP. Gateways may be used for internal and external communication bridging. The gateways have links to both the described network architecture and the external networks.

Figure 7:
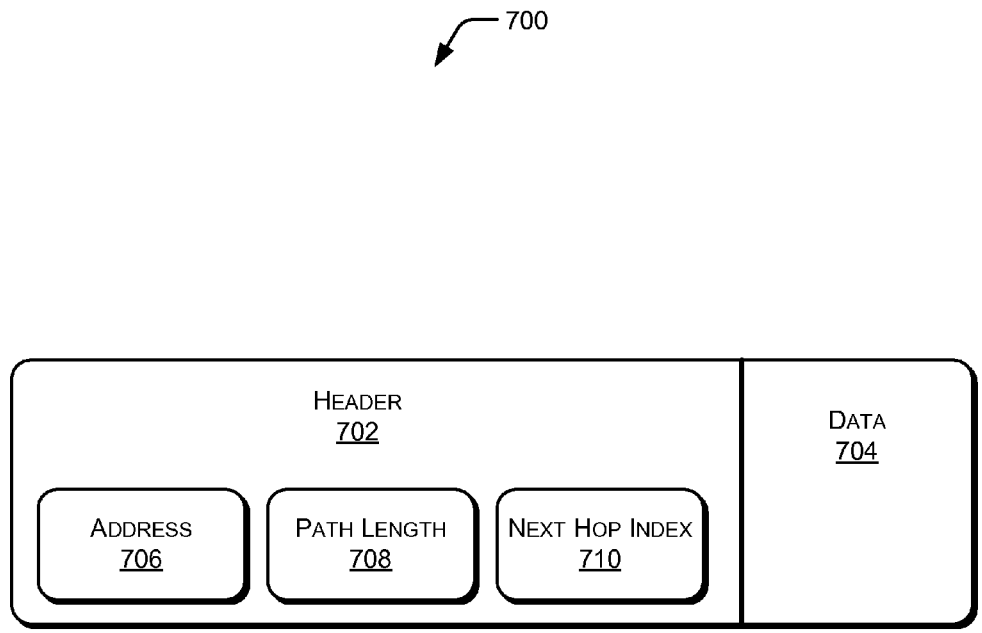
FIG. 7 is a block diagram of an exemplary packet.

FIG. 7 shows an exemplary packet 700. When an internal server sends a packet (e.g., packet 700) to an IP address that is not part of the described architecture network, an IP stack will choose an internal server inside the described network architecture as the gateway. The external IP to gateway mapping can be manually configured or dynamically adjusted based on network conditions. The packet (e.g., packet 700) is then routed to the gateway using BSR. After the gateway receives the packet (e.g., packet 700), it strips the described network architecture protocol header (e.g., header 702) and forwards the packet (e.g., packet 700) to the external network. The paths from external computers to internal servers can be constructed similarly. The multiple gateways may be used to handle large traffic volume and introduce load-balancing mechanisms to evenly distribute traffic. The packet 700 further includes data 704.

BCube Addressing

A 32-bit address (e.g. address 706 which is shown as a field of header 702) may be used to identify a server in the described network architecture. In typical shipping container settings, 16-bit may be sufficient; however, 32-bit is chosen in the described BCube network architecture, allowing for enough space for to supporting a much larger number of servers.

BCube Header

The header 702 of packet 700 may have a size of up to 40 bytes. Since source routing may be used, the packet 700 may include an entire path in its header 702. In this example, path length or PL 708 indicates path length. Next hop index or NHI 710 is a pointer that refers to the next path. The complete path is an next hop array or NHA (array).

If the 32-bit addresses are directly used, so many bytes are needed to store the complete path. For example, 32 bytes are needed when the maximum path length is 8. Leveraging may be performed based on the fact that neighboring servers in the described BCube network architecture differ in only one digit in their address arrays to reduce the space, needed for an intermediate server, from four bytes to only one byte. This byte may be referred to as NHA. NHA is divided into two parts: DP and DV. DP indicates which digit of the next hop is different from the current relay server, and DV is the value of that digit. NHA, together with the address of the relay server, uniquely determines the next hop address.

A flag F in header 702 may decide the number of bits in DP and DV. When F is 0 (or 1), DP has 2 (or 3) bits and DV has 6 (5) bits. When DP has 2 (or 3) bits, each server may at most have 8 ports, the NHA array length is 8 (or 12), and the described network architecture header 402 length is 36 (or 40) bytes. When DV is 6 (or 5), switches in the described network architecture have up to 64 (or 32) ports. NHA is used for both space saving and fast packet forwarding.

Exemplary Implementation Architecture

In the BCube network architecture, a multi-port NIC (network interface card) may be included at each server. Various cards and implementations may be used, including NetFPGA standards.

A software solution may be implemented, using the server CPU for packet forwarding. A hardware solution, using a network card (e.g., NetFPGA card) may also be implemented.

For the software solution, a network architecture protocol suite may be used as a network architecture kernel driver in the Windows® server 2003 networking stack. This implementation may accommodate various NIC and NetFPGA standards/cards. The network architecture driver locates between the TCP/IP protocol driver and the Ethernet NDIS (Network Driver Interface Specification) miniport driver. This may be referred to as network architecture driver or a 2.5-layer solution: to the TCP/IP driver, it is a NDIS miniport driver; to the real Ethernet miniport driver, it is a protocol driver. TCP/IP applications can directly run in BCube since they see only TCP/IP. In this implementation, a fixed, one-to-one mapping is established between an IP address and the described network architecture address.

The network architecture driver has two key components: BSR and the packet forwarding engine. BSR is not expected to be CPU intensive and is executed in the server CPU. The packet forwarding engine can be either in CPU (software solution) or in NetFPGA (hardware solution). Modular design allows support for both the NIC cards and NetFPGA with one single binary code.

Path probing and selection may be applied for each TCP connection. For other packets such as UDP and ICMP, path probing and selection may be applied per source and destination addresses pair. This may be applied, because TCP is a dominant transport protocol, and an implementation may be to split multiple TCP connections between two servers into multiple paths.

Packet Forwarding Engine

Using a packet forwarding engine, an intermediate server may use NHA to find a next hop. The packet forwarding engine, as discussed above, may be implemented in software or hardware, and may include a module(s) or device(s) to perform embedding information into packets and for forwarding the packets. To speed up packet forwarding, a forwarding table of the packet forwarding engine may be implemented using the NHA value as the index. The number of entries of the table is 256, if NHA is one byte. The number of valid entries is (k+1)(n−1), is the number of neighbors a server has.

Each entry may have three fields: OutPort, NeighborMAC, and ValidFlag. OutPort indicates the outgoing port number. OutPort is DP in NHA. The value is duplicated to avoid the logical AND and SHIFT operations on NHA. NeighborMAC is the MAC address of a neighbor, which is determined from neighbor discovery. ValidFlag indicates whether the neighbor is available.

One entry may need 8 bytes and the entire table may need only 2 KB memory. The forwarding table may be mostly static and easy to maintain. The number of entries in the table is fixed. For each entry, OutPort may never change, NeighborMAC may change only when the neighboring NIC is replaced, and ValidFlag may change only when the neighbor's status changes.

When an intermediate server receives a packet, it uses the NHI pointer to obtain the corresponding NHA value (i.e., the next hop). Using the NHA value as the index, it extracts the status and the MAC address of the next hop. If the next hop is alive, it updates the MAC header of the packet and forwards the packet to the identified output port. The forwarding procedure may just need one table lookup.

Implementation of the forwarding engine may be in software and hardware (e.g., NetFPGA). For example, using NetFPGA, table lookup can be performed and MAC header update in 5 clock cycles in a worst-case scenario. During this time frame, at most 40 B data may be received (with 64 bit processing width per cycle), which may be smaller than the smallest gap between two network architecture packets (which is the total length of a MAC header, a network architecture header, and an IP header). Hardware implementation (e.g., NetFPGA), therefore forwards packets at the line speed.

There may also be other network architecture driver components (such as neighbor maintenance protocol, available bandwidth estimation, network architecture broadcast), the described network architecture configuration program, and the NetFPGA miniport driver. For example, the network architecture driver may contain 16K lines of C code, the NetFPGA mini-port driver has 9K lines of C code, and the BCube NetF-PGA implementation contains 7K lines of Verilog (with 3.5K lines of Verilog for the forwarding engine).

The software solution may be CPU bounded. A server can handle 1.5-1.6 Gb/s data rate, which is lower than the physical bandwidth provided by the described network architecture. As an example, each server uses two Gigabit ports, resulting in 4 Gb/s aggregate physical bandwidth. In the hardware implementation, it may be possible to reduce the forwarding overhead to zero, but the interface between the PCI bus and NetFPGA may limit the throughput to 160 Mb/s.

Exemplary Method(s)

Exemplary methods for constructing a server-centric network architecture are described in reference to FIGS. 1 to 7. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 8:
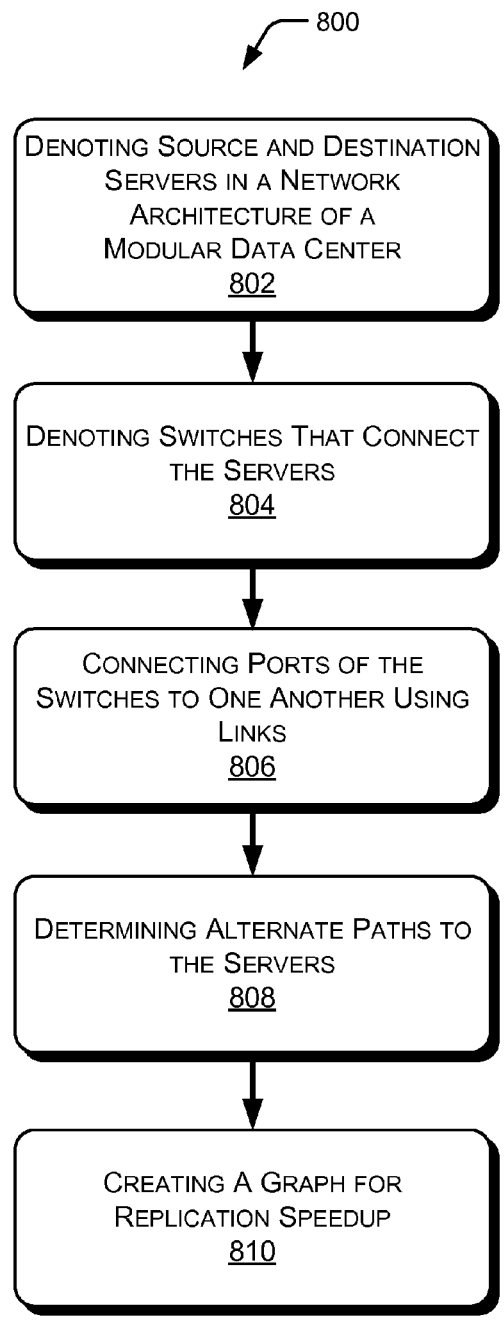
FIG. 8 is a flowchart that illustrates an exemplary method for constructing a server-centric network architecture.

FIG. 8 illustrates an exemplary method 800 for constructing a server-centric network architecture.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 802, denoting servers of a network architecture is performed. As discussed above, the network architecture may support a modular data center. Servers may be source servers, destination servers, or act as both source and destination servers. Denoting of the servers may be by address array. A one-to-one mapping may also be performed.

At block 804, denoting of switches, and level of the switches, that connect the servers is performed. The denoting of the switches may include an address and the level of the switches.

At block 806, connecting the ports of the switches to appropriate ports is performed. Connecting is performed using a bi-directional link.

At block 808, determining alternate paths to the servers is performed. As discussed above, the determining alternate paths may be performed based on maximum available bandwidth as discussed above. In particular, the BCube Source Routing or BSR protocol as discussed may be used.

At block 810, creating a graph for data replication speedup may be performed. As discussed, such graphs may be used in distributed file systems, such as GFS.

An Exemplary Computer Environment

Figure 9:
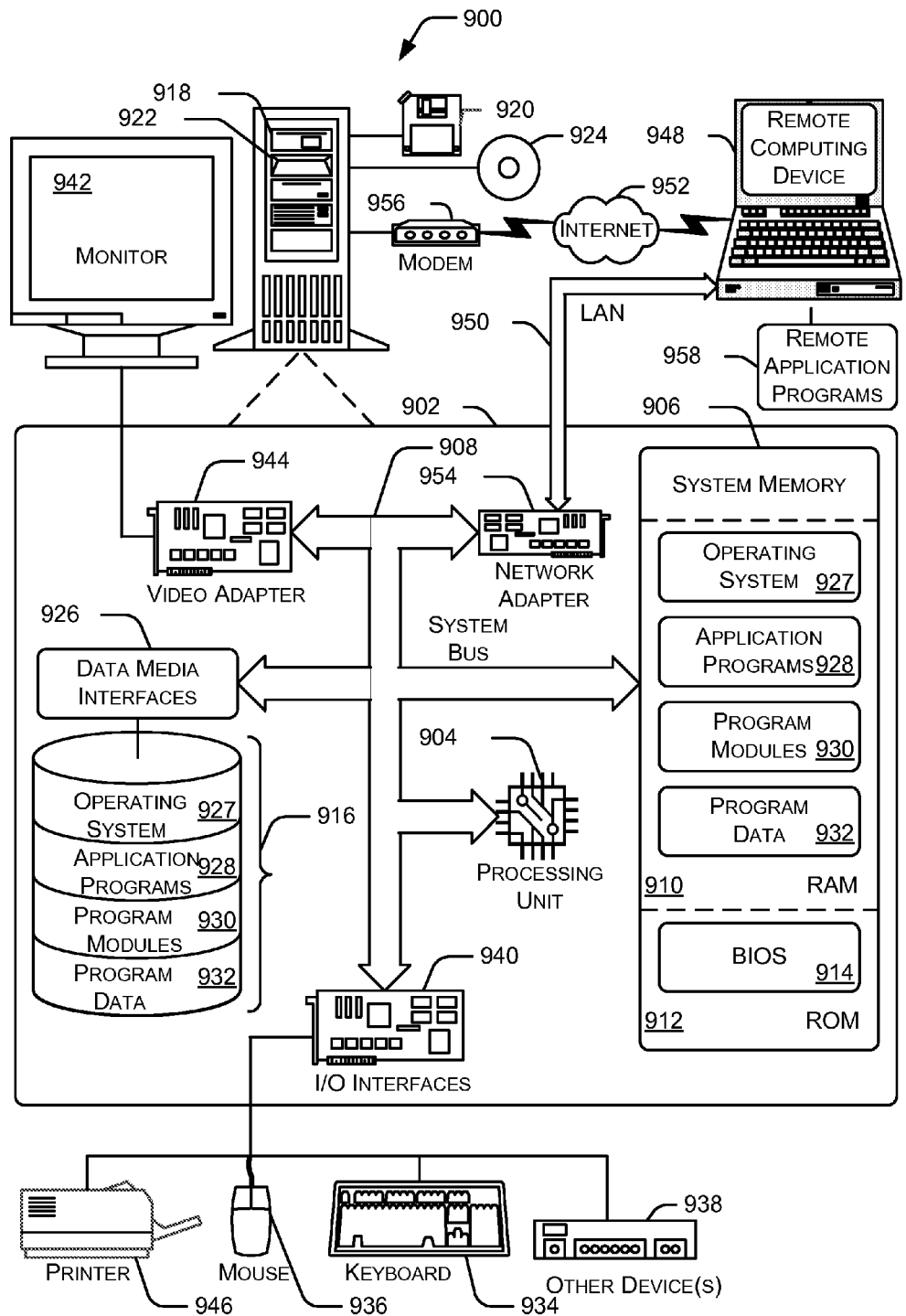
FIG. 9 is an exemplary general computer environment.

FIG. 9 illustrates an exemplary general computer environment 900, which can be used to implement the techniques described herein, and which may be representative, in whole or in part, of elements described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing-based device in the form of a computer 902. Computer 902 can be, for example, a desktop computer, a handheld computer, a notebook or laptop computer, a server computer, a game console, and so on. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912 is illustrated. RAM 910 typically contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown). Furthermore, FIG. 9 illustrates a magnetic disk drive 918 for reading from and writing to a removable, non-volatile magnetic disk 920 (e.g., a "floppy disk"), additionally FIG. 9 illustrates an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternately, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more applications 928, other program modules 930, and program data 932. Each of such operating system 926, one or more applications 928, other program modules 930, and program data 932 (or some combination thereof) may implement all or part of the resident components that support the distributed file system.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946, which can be connected to computer 902 via the input/output interfaces 940.

Computer 902 can operate in a networked environment using logical connections to one or more remote computers, such as a remote computing-based device 948. By way of example, the remote computing-based device 948 can be a personal computer, portable computer, a server, a router, a network computer, a peer device or other common network node, and the like. The remote computing-based device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote applications 958 reside on a memory device of remote computer 948. For purposes of illustration, applications and other executable program components such as the operating system are illustrated herein as discrete blocks, although it is recognized that such programs and components reside at various times in different storage components of the computing-based device 902, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing a server-centric network architectural design described in language specific to structural features and/or methods, it is to be understood that the subject of the appended claims is not necessarily limited to the specific features or methods described. Rather, the specific features and methods are disclosed as exemplary implementations for providing a unified console for management of devices in a computer network.

What is claimed is:

1. A method comprising:
under control of one or more processors configured with executable instructions:
assigning a first predetermined number of network ports to a plurality of servers of a network architecture;
arranging a plurality of switches having a second predetermined number of network ports into a predetermined number of levels; and
connecting the plurality of switches to the plurality of servers using bi-directional links, such that individual ones of the plurality of switches are not directly connected to another switch of the plurality of switches and individual ones of the plurality of servers are not directly connected to another server of the plurality of servers.

2. The method of claim 1, further comprising identifying individual servers within the plurality of servers with an address, the address comprising digits.

3. The method of claim 2, wherein a number of differences between first digits of an address of a first server within the plurality of servers and second digits of an address of a second server within the plurality of servers indicates a minimum number of switches indirectly connected between the first server and the second server.

4. The method of claim 2, wherein addresses of two adjacent servers of the plurality of servers uniquely identify an address of a switch between the two adjacent servers.

5. The method of claim 1, wherein a total number of the plurality of servers in the network architecture is based at least on the second predetermined number of network ports and the predetermined number of levels.

6. The method of claim 1, further comprising:
determining a plurality of paths that exist between a first server and a second server within the plurality of servers; and probing, at the first server, the plurality of paths to determine a path for traversing a packet between the first server and the second server based at least in part on a bandwidth of individual ones of the plurality of paths.

7. The method of claim 6, further comprising encoding the path into a packet header of the packet.

8. The method of claim 6, wherein the probing comprises determining whether to buffer the packet.

9. The method of claim 6, wherein the probing comprises employing a Breadth First Search (BFS) algorithm to determine the path for traversing the packet.

10. A system comprising:
one or more processors; and
memory, communicatively coupled to the one or more processors, storing instructions that, when executed by the one or more processors, configure the one or more processors to perform acts comprising:
connecting a plurality of switches to a plurality of servers, individual ones of the plurality of switches having no direct connection with another switch of the plurality of switches and individual ones of the plurality of servers having no direct connection with another sever of the plurality of servers; and
identifying individual ones of the plurality of servers with a first address and a second address, the first address and the second address comprising digits, wherein a number of differences between first digits of the first address of a first server of the plurality of servers and second digits of the second address of a second server of the plurality of servers indicates a minimum number of switches indirectly connected between the first server and the second server.

11. The system of claim 10, wherein addresses of two adjacent servers of the plurality of servers uniquely identify a third address of a switch between the two adjacent servers.

12. The system of claim 10, wherein the acts further comprise:
determining a plurality of paths that exist between a first server and a second server of the plurality of servers; and
probing, at the first server, the plurality of paths to determine a path for traversing a packet between the first server and the second server.

13. The system of claim 12, wherein the acts further comprise encoding the path into a packet header of the packet.

14. The system of claim 12, wherein the probing comprises determining whether to buffer the packet.

15. The system of claim 12, wherein the probing comprises employing a Breadth First Search (BFS) algorithm to determine the path for traversing the packet.

16. One or more hardware computer-readable media configured with computer executable instructions that, when executed by one or more hardware processors, configure the one or more hardware processors to perform acts comprising:
connecting a plurality of switches to a plurality of servers, individual ones of the plurality of switches having no direct connection with another switch of the plurality of switches and individual ones of the plurality of servers having no direct connection to another sever of the plurality of servers; and
identifying individual ones of the plurality of servers with a first address and a second address, the first address and second address comprising digits, wherein a number of differences between first digits of the first address of a first server of the plurality of servers and second digits of the second address of a second server of the plurality of servers indicates a minimum number of switches indirectly connected between the first server and the second server.

17. The one or more hardware computer-readable media of claim 16, wherein addresses of two adjacent servers of the plurality of servers uniquely identify a third address of a switch between the two adjacent servers.

18. The one or more hardware computer-readable media of claim 16, wherein the acts further comprise:
determining a plurality of paths that exist between a first server and a second server of the plurality of servers; and
probing, at the first server, the plurality of paths to determine a path for traversing a packet between the first server and the second server.

19. The one or more hardware computer-readable media of claim 18, wherein the acts further comprise encoding the path into a packet header of the packet.

20. The one or more hardware computer-readable media of claim 18, wherein the probing comprises determining whether to buffer the packet.

* * * * *